Dec. 24, 1968  H. BECKER  3,418,532
EXCESS CURRENT LIMITER FOR COUPLED POWER SYSTEMS
Filed April 25, 1966  2 Sheets-Sheet 1

Inventor:
Hans Becker
By: Spencer & Kaye
Attorneys

Dec. 24, 1968   H. BECKER   3,418,532
EXCESS CURRENT LIMITER FOR COUPLED POWER SYSTEMS
Filed April 25, 1966   2 Sheets-Sheet 2

Inventor:
Hans Becker
By: Spencer & Kaye
Attorneys

United States Patent Office 3,418,532
Patented Dec. 24, 1968

3,418,532
EXCESS CURRENT LIMITER FOR COUPLED POWER SYSTEMS
Hans Becker, Darmstadt, Germany, assignor to Licentia Patent-Verwaltungs G.m.b.H., Frankfurt am Main, Germany
Filed Apr. 25, 1966, Ser. No. 544,777
Claims priority, application Germany, Apr. 28, 1965, B 81,637
12 Claims. (Cl. 317—53)

ABSTRACT OF THE DISCLOSURE

An excess current limiter for coupled power system composed of a two-terminal network connected in series between two elements of the system and composed of an A.C. bridge having a plurality of inductive and capacitive reactances interconnected to form at least one series resonant circuit which is tuned substantially to the frequency of the system, and at least one series arrangement of a switching member and a current-limiting resistance connected between two terminals of the bridge for creating a large impedance between the two elements of the system when the current through the bridge exceeds a predetermined value.

---

The present invention relates to electric circuits, and particularly to arrangements for protecting such circuits from current overloads.

In the electric field it is often necessary to construct electric circuits composed of a large number of individual networks and circuit components. As the number of individual networks, or components, in a single circuit increases, the total power which must be supplied thereto also increases. As a result, if a short circuit should occur an excessively high power demand would be placed on the source supplying the circuit. This would create difficulties of a magnitude not normally encountered by the individual networks of the circuit. For example, individual circuit breakers associated with the various individual networks, which are fully capable of handling short circuits in their individual networks, might become so overloaded that they can only carry out their circuit breaking operation after a relatively large number of cycles of the overload current has passed, or, in some cases, they can not carry out their circuit breaking operation at all. In addition, such large overloads could lead to serious damage of the current-carrying elements of the power supply installation. For example, current overloads in the installation can result in the burning out of transformers, the fusing of conductors, and the destruction of switch elements.

Since both the thermal effects and the dynamic effects of the short circuit currents will cause damage and undesirable temporary disturbances, a different type of circuit protecting arrangement must be provided. However, it has been found that when an additional circuit protection arrangement is provided specifically for protecting against these high current overloads, the individual network groups can only be partially protected. Moreover, even this high power protective switch is not capable of operating rapidly enough to completely eliminate the dynamic effects of current overloads.

Complete circuit protection can only be achieved if current overloads are suppressed immediately upon their occurrence, i.e., only if the very first half wave of the current surge is suppressed or impeded.

It is only when the current surge suppression is carried out in this manner that the individual network groups can be protected from the dynamic effects of an excessively high current. Moreover, when such a current suppression is effected the entire circuit and the switches located therein can be protected from overloads and can be permitted to carry out their circuit breaking functions at a normal speed. As a result, auxiliary or parallel power generating stations will not be required to feed short circuit currents into the defective circuit and all of the power stations will be in a condition to immediately resume normal operation after the defective circuit has been disconnected. Specifically, if the excessively high current is limited, or suppressed, before the various components of the power stations and the load circuits can be permanently damaged, it will be possible to resume normal operation within a relatively short time and the entire power net will not collapse as readily as it would if such specific current surge suppression measures were not taken.

One type of arrangement which has already been suggested for effectuating an operation of the above-described type utilizes in normal operation magnetically supersaturated chokes connected into a circuit coupling. These chokes act as current limiters which immediately come into operation to reduce the degree of coupling when a predetermined maximum or peak current is exceeded and which restore a tight coupling as soon as the current has dropped below the predetermined level. The provision of the devices of this type entails a relatively large additional expenditure. Moreover, this solution has the added disadvantage that a relatively large reactance voltage appears across the choke during normal operation and thus causes an undesirable voltage drop to exist in the coupling. The same is true of short circuit choke coils containing no iron, these choke coils being relatively old in the art and having been customarily inserted into such junctions.

It is also known in the art to couple two networks by a series connection consisting of one inductance, one capacitance, and means for selectively short-circuiting the capacitance, to tune this series connection so that it will provide a low impedance between the networks during normal operation, and to increase the impedance of the connection by short-circuiting the capacitance whenever an excessively high current begins to flow between the networks. Such an arrangement is limited, particularly with respect to the magnitude of the impedance variation which it can produce.

It is known that, for short-circuiting, or bridging, the capacitance, spark gaps, switches, or saturable choke coils can be used.

It is additionally known to connect the components of the resonant circuit in the form of a bridge circuit, with inductances being disposed in two respectively opposite branches and capacitances being disposed in the other two respectively opposite branches, and to interconnect a saturable choke coil between two diagonally opposed terminals of the bridge. The choke coil serves as an excess-current-dependent switching member. The connection of the bridge into the system current path is effected via the other two diagonally opposite terminals.

Such an arrangement, in which the switching member abruptly short-circuits, or in which the impedance of the saturable choke coil is abruptly reduced to a very low value when saturation is reached, will not operate satisfactorily in high-voltage networks operating at high power levels because of the substantial oscillations which will be produced when the switching member is operated.

It is an object of the present invention to provide an improved arrangement for performing a current suppressing operation of the previously-described type.

It is another object of the present invention to eliminate the drawbacks of prior art arrangements employed for carrying out such an operation.

Another object of the present invention is to limit or suppress excessively high currents in a simple and inexpensive manner.

These and other objects are achieved, according to the present invention, by the provision, in combination with an electrical system composed of a group of elements including a power source and a plurality of load networks, of means for limiting the flow of excess currents upon the occurrence of a fault or a dropping out of synchronism by one of the networks. This means includes at least one two-terminal network connected in series between two of the system elements, the two-terminal network being in the form of an A.C. bridge. Such a bridge includes a plurality of inductive and capacitative reactances interconnected to form at least one series resonant circuit which is tuned substantially to the frequency of the system and which offers substantially no resistance to the flow of current between the elements under normal operating conditions. The bridge further includes at least one switching member connected in the bridge for detuning the series circuit when the current through the bridge exceeds a predetermined value, this detuning acting to create a large impedance between the elements for limiting the amplitude of current flow therebetween. There is also provided, in accordance with the present invention, a resistance in series with each switching member, this resistance serving to attenuate current oscillations which tend to arise when a short circuit occurs in the system being protected.

In accordance with a first form of construction of the present invention, the switching member may be constituted by a saturable choke which presents a high reactive impedance during normal operation and which reaches saturation when a predetermined current level is attained, whereby its reactive impedance is considerably reduced. Such an arrangement has the advantages that its operation is practically instantaneous and that it does not require the provision of any mechanical switches across which electric arcs would form during switch opening and closing.

In certain cases, it may be desirable to apply a magnetic bias to the saturable choke either directly or indirectly, in the manner of a transducer choke.

Additional objects and advantages of the present invention will become apparent upon consideration of the following description when taken in conjunction with the accompanying drawings in which.

Figure 1:
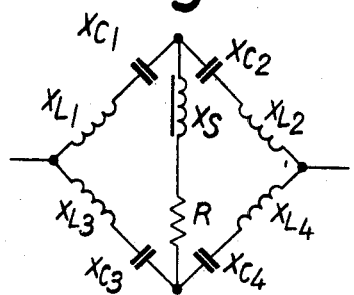
FIGURE 1 is a schematic diagram of a first embodiment of the present invention.

FIGURE 1 is a schematic diagram illustrating a bridge circuit constituting a first embodiment of the present invention. This circuit includes a saturable choke $X_s$ connected in series with a resistance R between two opposite terminals of the bridge. Each of the bridge arms includes a respective one of the inductive reactances $X_{L_1}$, $X_{L_2}$, $X_{L_3}$, and $X_{L_4}$, and a respective one of the capacitive reactances $X_{C_1}$, $X_{C_2}$, $X_{C_3}$, and $X_{C_4}$. All of the reactances in the bridge arms are selected so that each series circuit, here constituted by two bridge arms, is tuned to series resonance for the fundamental frequency of the system in which it is connected. As a result, the bridge will provide substantially zero impedance, at this frequency and under normal operating conditions, between the elements connected in series via the other two opposite bridge terminals. In other words, reactances $X_{L_1}$, $X_{L_2}$, $X_{C_1}$ and $X_{C_2}$ form one series resonant circuit.

The heat dissipation capability which each reactance must have is determined by the current distribution between the two parallel bridge paths in the case of a short circuit, this distribution being determined by the effective impedance of each path.

In order for the saturable choke $X_s$ to be able to carry out its intended switching operation, it is necessary that the bridge present an unsymmetrical impedance distribution in such a manner that a voltage differential exists across the series branch defined by choke $X_s$ and resistance R. In operation, the saturable choke $X_s$ presents an extremely high impedance when a normal current level is flowing through the bridge. In this condition, each of the bridge current paths presents a tuned series circuit which offers substantially no resistance to the flow of current. However, when the current through the bridge exceeds a predetermined amplitude, it will create a voltage across the saturable choke which drives the choke into saturation, thereby rendering the choke highly conductive and detuning the series LC-circuits. The level of the resulting current flow through the choke $X_s$ is limited by the series resistance R whose value is chosen for the purpose of limiting the current through the choke to a safe value. The resistance R also serves to attenuate current oscillations which tend to arise when a short circuit occurs. This attenuation of the current oscillations serves to substantially reduce the power loads to which the elements of the electrical system and the components of the A.C. bridge are subjected when such a short circuit occurs.

All of the further embodiments of the present invention, which will be described in detail below, operate in the same manner.

Figure 2:
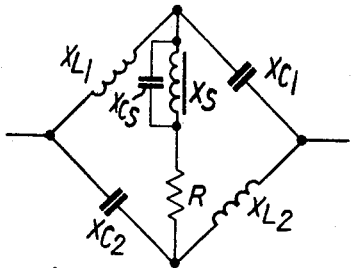
FIGURE 2 is a schematic diagram of another embodiment of the present invention.

Referring now to FIGURE 2, there is shown another embodiment of the present invention which constitutes a simplified version of the circuit of FIGURE 1. In this arrangement there are provided only two inductive reactances $X_{L_1}$ and $X_{L_2}$ disposed in respective opposite arms of the bridge. Each of the remaining bridge arms is constituted by a respective one of the capacitive reactances $X_{C_1}$ and $X_{C_2}$. In this embodiment, the two inductive reactances may be identical, as may be the two capacitive reactances. One of the advantages of this embodiment is that the voltage across the branch constituted by switching element $X_s$ and resistance R is equal to twice the voltage across any one bridge arm. There is also provided a capacitive reactance $X_{C_s}$ connected in parallel with inductive reactance $X_s$. The value of reactance $X_{C_s}$ is chosen so as to form a parallel resonant circuit with $X_C$ at the fundamental system frequency. Such a parallel resonant circuit will represent a very high impedance during normal operation.

Figure 3:
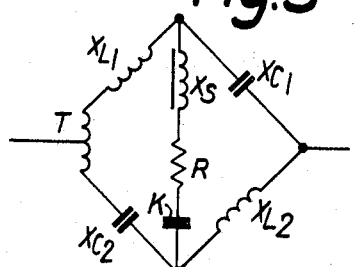
FIGURE 3 is a schematic diagram of a modified version of the embodiment of FIGURE 2.

Turning now to FIGURE 3, there is shown an arrangement which is substantially identical to that shown in FIGURE 2, with the addition of a current divider T connected in series between two bridge arms and having a center tap connected to one of the input terminals of the bridge for achieving a uniform current distribution between the two parallel current paths defined by the bridge arms. This current divider is preferably constituted by an inductance.

It may be noted that the arrangement of a bridge circuit of the type shown in FIGURE 2 is such that a flow path for the direct current component of a short circuit current exists when the switching element $X_s$ has been driven into saturation, this path being defined by inductive reactances $X_{L_1}$ and $X_{L_2}$, switching element $X_s$ and resistance R, the amplitude of this current being effectively limited only by the resistance R. When such a condition exists, it is desirable to provide direct current blocking means in each branch containing a switching member. Such a current blocking means is shown in FIGURE 3 to be constituted by a further capacitor K connected in series with switching member $X_s$ and resistance R for blocking the flow of the D.C. component of a short circuit current.

A more effective and well-defined switching operation can be achieved in circuits having a blocking capacitor in series with the switching member if this blocking capacitor is given such a value that it will form a series resonant circuit with its associated switching element when the latter is in its saturated condition. When this relation exists, the residual inductance of the saturable choke constituting the switching member will be completely compensated and the only series resistance in this branch will be that of the resistor R.

In another form of construction according to the present invention, the bridge circuit could be provided with a series resonant LC-circuit formed by a combination of the branch between two opposite bridge terminals and a pair of opposing bridge arms. The other two opposing bridge arms would each be provided with a separate switching member connected in series with a respective resistance.

Figure 4:
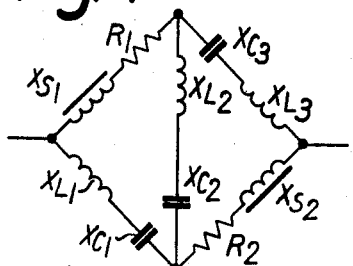
FIGURE 4 is a schematic diagram of a further embodiment of the present invention.

One embodiment of such an arrangement is shown in FIGURE 4 wherein there is provided a series resonant circuit composed of reactances $X_{L_1}$, $X_{L_2}$ and $X_{L_3}$ and reactances $X_{C_1}$, $X_{C_2}$ and $X_{C_3}$. Each of the remaining opposing pairs of bridge arms is constituted by a respective one of the switching members $X_{S_1}$ and $X_{S_2}$ each connected in series with a respective one of the resistors $R_1$ and $R_2$.

The principle of operation of this circuit is identical with that of the previously-described circuits. During normal operation, the tuned series resonant circuit provides a low impedance current path between the two system elements to which the bridge is connected and substantially no current flows through the bridge arms containing the switching members. When the current through the bridge exceeds a predetermined level, the switching members are driven into saturation, thereby detuning the bridge circuit in such a manner as to create a high impedance between the system elements.

Figure 5:
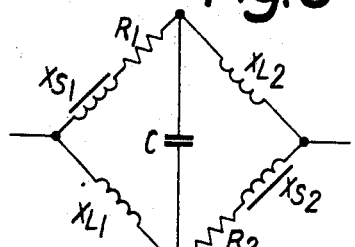
FIGURE 5 is a schematic diagram of still another embodiment of the present invention.

FIGURE 5 shows a modified version of the embodiment of FIGURE 4 wherein the tuned series resonant circuit through which current flows during normal operation is constituted by two inductive reactances $X_{L_1}$ and $X_{L_2}$ each connected in a respective one of two opposite bridge arms and by a single capacitance C connected between two opposite bridge terminals.

Figure 6:
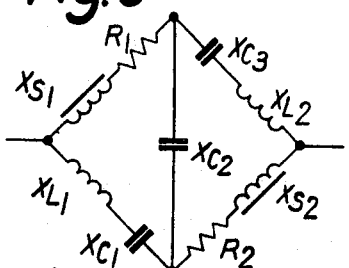
FIGURE 6 is a schematic diagram of yet another embodiment of the present invention.

FIGURE 6 shows another modified version of the arrangement of FIGURE 4 wherein the series LC-circuit connected between two opposite bridge terminals is replaced by a capacitive reactance $X_{C_2}$. In this embodiment, the inductive and capacitive reactances are given values such that the series arrangement of inductive reactances $X_{L_1}$ and $X_{L_2}$ and the capacitive reactances $X_{C_1}$, $X_{C_2}$ and $X_{C_3}$ constitute a series resonant circuit which is tuned to the fundamental system frequency.

It should be noted that the disposition of a capacitor in the branch between two opposite bridge terminals in the embodiment of FIGURES 4 and 6 makes it unnecessary to provide an additional capacitor in series with each switching member for the purpose of blocking the flow of the direct current component of a short circuit current.

Figure 7:
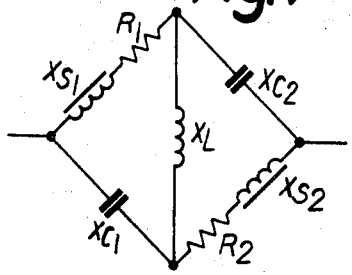
FIGURE 7 is a schematic diagram of a modified version of the embodiment of FIGURE 5.

FIGURE 7 shows a modified version of the circuit of FIGURE 5 wherein the capacitor C of FIGURE 5 is replaced by a single inductive reactance $X_L$ and the inductive reactances $X_{L_1}$ and $X_{L_2}$ are replaced by capacitive reactances $X_{C_1}$ and $X_{C_2}$, respectively. It will be readily appreciated that the operation of the circuit of FIGURE 7 is identical with that of the circuit of FIGURE 5.

Figure 8:
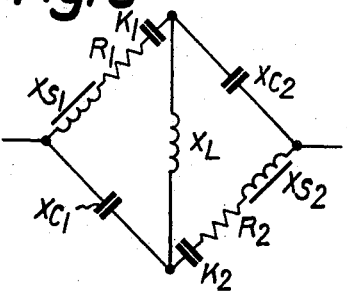
FIGURE 8 is a schematic diagram of a modified version of the embodiment of FIGURE 7.

FIGURE 8 shows an arrangement which is identical with that of FIGURE 7 except that the FIGURE 8 circuit includes blocking capacitors $K_1$ and $K_2$ each connected in series with a respective one of the switching chokes $X_{S_1}$ and $X_{S_2}$ for blocking the D.C. component of the short circuit current.

In the drawings, all of the embodiments are shown to be directly connected between two system elements and all of the bridge circuit components are shown to be connected directly in various arms or branches. However, these embodiments could equally well be arranged with the entire bridge circuit, or with individual components of the bridge circuit, connected through the intermediary of a transformer if such an expedient is required for economic reasons or in order to solve specific design problems, such as those pertaining to the electrical insulation of various ones of the bridge circuit components for example.

In the construction of current limiting bridge circuits according to the present invention, it is generally preferable to utilize switching members having the form of saturable chokes because such switching members produce a far more rapid switching operation than comparable electromechanical or electronic switching elements which inherently require a substantially longer period of time to change states. When saturable choke switching members are used, the excessive current itself acts directly to produce the current limiting switching operation in such a manner that this operation occurs simultaneously with the growth of the excessive, short-circuit current. Therefore, the current limiting operation begins immediately and positively as soon as a predetermined current level has been exceeded. In addition to the fact that circuits according to the present invention produce a completely automatic, substantially instantaneous current limiting operation, they also have the advantage of being quite sturdy and of being immune to permanent damage due to current overloads.

Another substantial advantage of the present invention resides in the fact that it eliminates the need for any physical separation between the elements connected together by a single bridge circuit. This is true because a short-circuit current flowing through the bridge circuit causes the circuit to automatically insert a relatively high impedance between the two elements.

Then, as the amplitude of the short-circuit current decreases, the effective impedance of the bridge circuit also decreases, thereby decreasing the voltage drop thereacross. When the current has once again dropped below the predetermined level, the impedance which the bridge circuit presents between the two system elements will automatically return to a very low value and therefore a tight coupling will once again exist between these two elements.

Thus, the circuit limiting effect of a bridge circuit according to the present invention is automatically and immediately removed as soon as the fault which originally caused the excessive current flow is corrected.

If desired, embodiments of the present invention can also be constructed employing controllable rectifiers, connected in a parallel-opposing manner, as the switching members. In addition, it is also possible to employ, as the switching members, surge voltage arresters, or the elements thereof, spark gaps, or voltage-dependent resistances as the switching members.

One example of the schematic diagram of FIGURE 1 will this substitution of the switching member will be illustrated.

Figure 9:
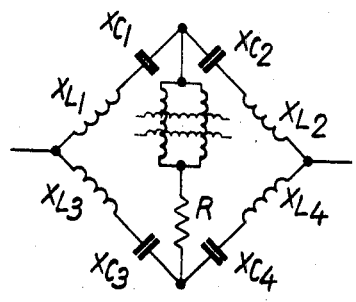
FIGURES 9-13 show the schematic diagram of FIGURE 1 wherein the switching member is modified.
Figure 10:
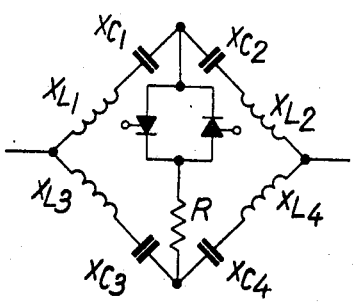

FIGURE 9 shows the employment of a transducer choke. Surely here is the need of an additional energy source or a special control circuit as it is in the next example in FIGURE 10 where two controllable rectifier units are connected in a parallel-opposing manner. These controllable rectifier units can be vacuum tubes or rectifier cells named thyristors.

Figure 11:
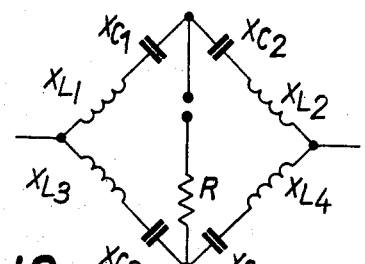
Figure 12:
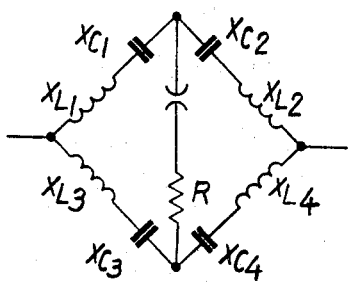
Figure 13:
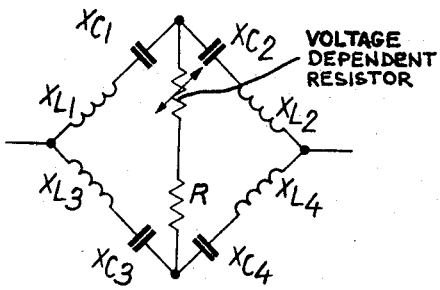

The diagram of FIGURE 11 uses a surge voltage arrester as the switching member, FIGURE 12 only a spark gap and FIGURE 13 a voltage-dependent resistance.

It will be understood that this embodiment of the switching member by the mentioned elements will succeed in the other diagrams as well but the first shown saturable choke will be the best one in the desired function.

It will be understood that the above description of the present invention is susceptible to various modifications, changes, and adaptations, and the same are intended to be comprehended within the meaning and range of equivalents of the appended claims.

What is claimed is:

1. In combination with an electrical system composed of a group of elements including a power source and a plurality of load networks, means for limiting the flow of excess currents upon the occurrence of a fault or a dropping out of synchronism of said networks, said means including at least one two-terminal network connected in series between two of said system elements, said two-terminal network being an A.C. bridge comprising:

(a) a plurality of inductive and capacitive reactances interconnected to form at least one series resonant circuit which is tuned substantially to the frequency of said system and which offers substantially no resistance to the flow of current between said elements under normal operating conditions;
    (b) at least one switching member connected in said bridge for detuning said series circuit when the current through said bridge exceeds a predetermined value, thereby to create a large impedance between said elements for limiting the amplitude of current flow therebetween; and
    (c) a current-limiting resistance connected in series with said switching member for attenuating current oscillations when said switching member is actuated.

2. An arrangement as defined in claim 1 wherein said switching member is constituted by a saturable choke whose saturation voltage is equal to that applied thereacross by said bridge when the current through said bridge exceeds said predetermined value.

3. In combination with an electrical system composed of a group of elements including a power source and a plurality of load networks, means for limiting the flow of excess currents upon the occurrence of a fault or a dropping out of synchronism of said networks, said means including at least one two-terminal network connected in series between two of said system elements, said two-terminal network being an A.C. bridge comprising:

(a) a plurality of inductive and capacitive reactances interconnected to form at least one series resonant circuit which is tuned substantially to the frequency of said system and which offers substantially no resistance to the flow of current between said elements under normal operating conditions;
    (b) at least one switching member connected in said bridge for detuning said series circuit when the current through said bridge exceeds a predetermined value, thereby to create a large impedance between said elements for limiting the amplitude of current flow therebetween; and
    (c) a current-limiting resistance connected in series with said switching member;
    (d) wherein said switching member and current limiting resistance are connected in series between two opposed terminals of said bridge, and said plurality of reactances is interconnected to form one series resonant circuit in each current path of said bridge, the values of said reactances being chosen for producing a voltage across said switching member which is proportional to the amplitude of the total current through said bridge.

4. An arrangement as defined in claim 1 wherein said switching member has the form of a saturable choke which functions as a transducer whose magnetic bias becomes effective when the current through said bridge exceeds said predetermined value.

5. An arrangement as defined in claim 1 wherein said switching member is constituted by a controllable rectifier.

6. An arrangement as defined in claim 1 wherein said switching element is constituted by at least one member of a surge voltage arrester.

7. An arrangement as defined in claim 1 wherein said switching member is constituted by a spark gap.

8. An arrangement as defined in claim 1 wherein said switching member is constituted by at least one voltage-dependent resistance.

9. In combination with an electrical system composed of a group of elements including a power source and a plurality of load networks, means for limiting the flow of excess currents upon the occurrence of a fault or a dropping out of synchronism of said networks, said means including at least one two-terminal network connected in series between two of said system elements, said two-terminal network being an A.C. bridge comprising:

(a) a plurality of inductive and capacitive reactances interconnected to form at least one series resonant circuit which is tuned substantially to the frequency of said system and which offers substantially no resistance to the flow of current between said elements under normal operating conditions;
    (b) two switching members connected in said bridge for detuning said series circuit when the current through said bridge exceeds a predetermined value, thereby to create a large impedance between said elements for limiting the amplitude of current flow therebetween; and
    (c) two current-limiting resistors each connected in series with a respective switching member;
    (d) wherein each said switching member constitutes, together with its associated resistor, a respective one of two opposite arms of said bridge, and said plurality of reactances is connected in the remaining two arms of said bridge and between a first pair of opposite terminals of said bridge to form a first series resonant circuit, each of said system elements being connected to a respective terminal of the other pair of opposite terminals of said bridge, the values of said reactances being chosen for causing a voltage to be present across each arm of said bridge which contains one of said switching members, each said voltage being proportional to the current flowing between said two system elements.

10. In combination with an electrical system composed of a group of elements including a power source and a plurality of load networks, means for limiting the flow of excess currents upon the occurrence of a fault or a dropping out of synchronism of said networks, said means including at least one two-terminal network connected in series between two of said system elements, said two-terminal network being an A.C. bridge comprising:

(a) a plurality of inductive and capacitive reactances interconnected to form at least one series resonant circuit which is tuned substantially to the frequency of said system and which offers substantially no resistance to the flow of current between said elements under normal operating conditions;
    (b) at least one switching member connected in said bridge for detuning said series circuit when the current through said bridge exceeds a predetermined value, thereby to create a large impedance between said elements for limiting the amplitude of current flow therebetween; and
    (c) an additional direct current blocking capacitor connected in series with said switching member for blocking the flow of direct current through said member.

11. In combination with an electrical system composed of a group of elements including a power source and a plurality of load networks, means for limiting the flow of excess currents upon the occurrence of a fault or a dropping out of synchronism of said networks, said means including at least one two-terminal network connected in series between two of said system elements, said two-terminal network being an A.C. bridge comprising:

(a) a plurality of inductive and capacitive reactances interconnected to form at least one series resonant circuit which is tuned substantially to the frequency of said system and which offers substantially no resistance to the flow of current between said elements under normal operating conditions;

(b) at least one switching member connected in said bridge for detuning said series circuit when the current through said bridge exceeds a predetermined value, thereby to create a large impedance between said elements for limiting the amplitude of current flow therebetween; and (c) a current divider connected in series between two arms of said bridge and one of said system elements.

12. An arrangement as defined in claim 10 wherein said switching member is constituted by a saturable choke and said direct current blocking capacitor forms a tuned, series-resonant circuit with its assoicated choke when said choke is in its saturated condition.

References Cited

UNITED STATES PATENTS

| | | | |
|---|---|---|---|
| 2,772,396 | 11/1956 | Buie | 317—147 X |
| 3,047,746 | 7/1962 | Berkery | 317—20 X |
| 3,099,789 | 7/1963 | Perrins | 317—20 X |
| 3,155,879 | 11/1964 | Cosey et al. | 317—33 X |
| 3,209,207 | 9/1965 | La Sota et al. | 317—147 X |
| 3,273,018 | 9/1966 | Goldberg | 317—33 X |
| 3,308,345 | 3/1967 | Warrington | 317—147 X |

FOREIGN PATENTS

| | | |
|---|---|---|
| 1,113,261 | 8/1961 | Austria. |
| 671,310 | 1/1939 | Germany. |
| 753,352 | 8/1944 | Germany. |

JOHN F. COUCH, *Primary Examiner.*

R. V. LUPO, *Assistant Examiner.*

U.S. Cl. X.R.

317—20, 147